(No Model.)
I. CORNELIUSSEN.
JOURNAL BEARING.
No. 531,410. Patented Dec. 25, 1894.
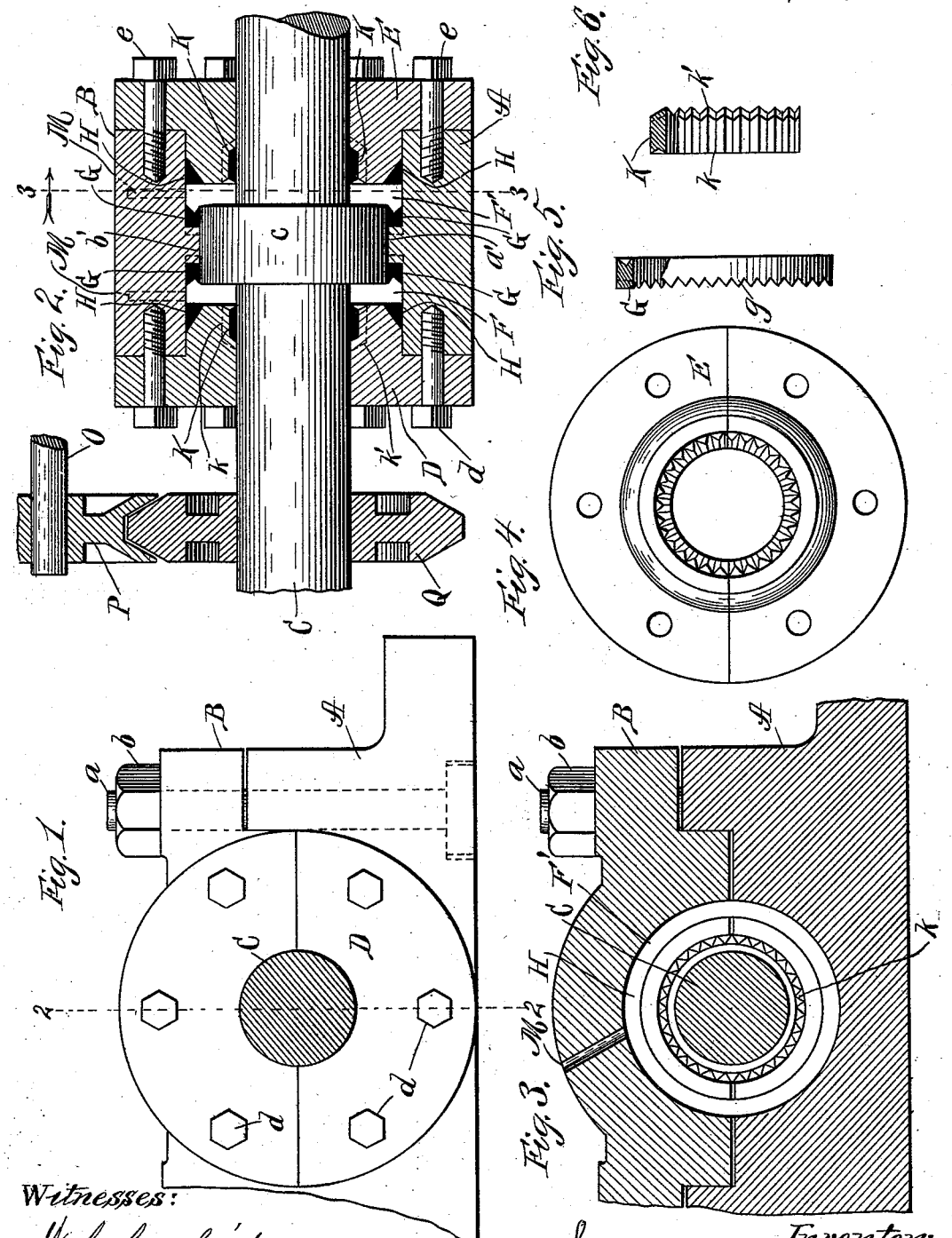
Witnesses:
W. C. Colvés
Jno. A. Christianson.
Inventor:
Ivar Corneliussen
By Louis K. Gillson
Attorney.

UNITED STATES PATENT OFFICE.

IVAR CORNELIUSSEN, OF CHICAGO, ILLINOIS.

JOURNAL-BEARING.

SPECIFICATION forming part of Letters Patent No. 531,410, dated December 25, 1894.

Application filed May 21, 1894. Serial No. 511,889. (No model.)

*To all whom it may concern:*

Be it known that I, IVAR CORNELIUSSEN, a subject of the King of Sweden and Norway, residing at Chicago, in the county of Cook and State of Illinois, have invented certain new and useful Improvements in Journal-Bearings; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to journals for thrust shafts, particularly for the shafts of screw propellers. Its object is to provide a fluid bearing for such shafts and to pack the journal box against leakage of the liquid, and to adapt the journal for use between the crank of the shaft and its screw.

The invention consists of the use of a circumferential rib upon the shaft, a journal box adapted to receive the rib and having chambers upon each side of it filled with oil or other liquid, and a special arrangement of packing material for retaining the liquid.

It consists further of the special form of applying power to a pump for replenishing the liquid, as shown and described.

In the accompanying drawings Figure 1, is an end elevation of the journal block, the shaft being shown in section. Fig. 2, is a longitudinal section on the line 2—2 of Fig. 1. Fig. 3, is a transverse section on the line 3—3 of Fig. 2. Fig. 4, is an inside elevation of one of the glands of the journal box, showing the packing rings. Figs. 5 and 6 are details of the packing rings.

The journal box consists of the pillow block A, and the cap B, adapted to fit thereon, these two parts being secured together by bolts, one of which is shown at $a$, and its nut at $b$. The contiguous sides of the block A and cap B are longitudinally centrally recessed so as together to form an aperture for the shaft C. The shaft C is provided with an annular rib or band, $c$. The shaft aperture of the box is of greater diameter than this band $c$, at both ends, but is reduced to the same diameter at the center, the pillow block A and cap B, each having an internal rib, $a'$, $b'$, which together form an annular rib. This rib is of less width than the band $c$.

The ends of the journal box are closed by glands D, E, bolted to the pillow block and cap by the bolts $d$, $e$. These glands extend into the shaft aperture of the box but do not reach to the band $c$. The intervening space between the ends of the glands and the band $c$ is filled with the liquid used for the journal bearing. These chambers are indicated at F, F'. When pressure is from the direction of the gland E it is resisted by the liquid cushion F; when from the opposite direction it is resisted by the cushion F'. In order to prevent leakage from one chamber to the other flexible packing rings G, G, are placed around the band $c$, at each side of the rib $a'$, $b'$, and the faces of these rings which are exposed to the liquid are V-shaped so that the pressure tends to force the edges laterally. The inner ends of the glands D, E, are beveled at their edges and the triangular spaces thus formed are filled with flexible packing rings H, H. The wedge shape of these rings insures a tight joint around the glands. The inner end of the shaft aperture of each gland is enlarged to receive the packing rings K, K, of flexible material. To prevent the rings G, G, K, K, from turning with the shaft the seat of each is indented or notched as shown at $k$, as to the seat of the ring K, and the rings assume the same form as shown at $g$, $k'$.

At M, M, are shown ducts entering the chambers F, F', through the cap B, for the purpose of introducing the liquid into such chambers. Any form of pump may be used for this purpose. The construction of pumps and the means of attaching them to such ducts being well known I have not deemed it necessary to show more than the means for automatically operating the pump. This consists of the friction-gear mounted upon the shaft C and shown at Q, and a co-operating gear P, mounted upon the driving shaft, O, of the pump. The periphery of the gear P is grooved and the edges of the rim of the gear Q are beveled to correspond with this groove. The two gears are so set that when the shaft is in its normal position with reference to the journal box they are not in contact, but the beveled edges of the gear Q are so close to the sides of the groove of the gear P that a very slight longitudinal movement of the shaft C in either direction brings the two gears into contact and the pump is set in motion. If therefore there is any escape of liquid, even of a very small quantity, from either of the chambers F, F', the loss is immediately made good by the action of the pump. As soon as the normal quantity of liquid is restored in the chambers the shaft is brought back to its proper position and the gears P, Q, are separated and the pump stopped.

I claim as my invention—

1. The combination with a thrust shaft having a band, C, of a journal box inclosing the shaft and having an internal annular rib of less width than the band C, and serving as a circumferential bearing therefor, glands, D, E, for closing the ends of the box and adapted to form with the band and with the walls of the box annular chambers at each side of the band, liquid filling the chambers, and packing rings G, G, for preventing communication between the chambers, substantially as described and for the purpose set forth.

2. The combination with a thrust shaft having a band, C, of a journal box inclosing the shaft and having an internal annular rib of less width than the band C and serving as a circumferential bearing therefor, glands, D, E, for closing the ends of the box and adapted to form with the band and with the walls of the box annular chambers at each side of the band, liquid filling the chambers, packing rings, G, G, for preventing communication between the chambers, ducts leading to the chambers, and means for automatically replenishing the liquid, substantially as described and for the purpose set forth.

3. The combination with the thrust shaft C, having an annular band, c, a chambered journal box inclosing the band, c, and having an annular rib of less width than and in frictional contact with the band, of packing rings encircling the band on each side of the rib and having their outer faces annularly grooved, substantially as and for the purpose set forth.

In testimony whereof I affix my signature in presence of two witnesses.

IVAR CORNELIUSSEN.

Witnesses:
LOUIS K. GILLSON,
VICTOR E. BOSTROM.